UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

GALLOCYANIN DYE AND PROCESS OF MAKING.

936,247.      Specification of Letters Patent.      Patented Oct. 5, 1909.

No Drawing. Original application filed December 8, 1908, Serial No. 466,489. Divided and this application filed June 16, 1909. Serial No. 502,522.

*To all whom it may concern:*

Be it known that I, WILHELM LOMMEL, doctor of philosophy, chemist, citizen of the German Empire, residing at Elberfeld, Germany, have invented new and useful Improvements in Gallocyanin Dye, of which the following is a specification.

My invention relates to the production of sulfonic acids from oxidized condensation products of gallocyanins and amins.

The present application, which is a divisional application from my application Serial No. 466,489, filed December 8th, 1908, covers specifically the new dyestuffs produced from gallocyanin obtained from nitrosodiethyl-anilin and gallic acid.

The diethylgallocyanin color is first condensed with an aromatic amin at ordinary temperature and the compound thus produced is oxidized by a current of atmospheric air or oxygen. A carrier of oxygen e. g. a manganese, iron or vanadium compound may be added to the mass to facilitate the reaction, and the oxidation can also be carried on simultaneously with the reaction of condensation. The substances thus obtained have probably the following general formula, in which R means an aromatic radical.

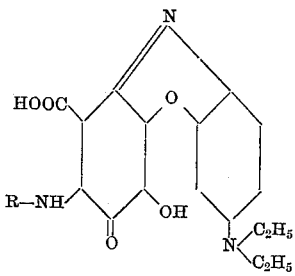

By heating these products, the carboxyl group is split off. After heating the substances are finally sulfonated, the sulfo group entering into the molecule of the aromatic amin and thus giving coloring matters possessing probably the following general formula:

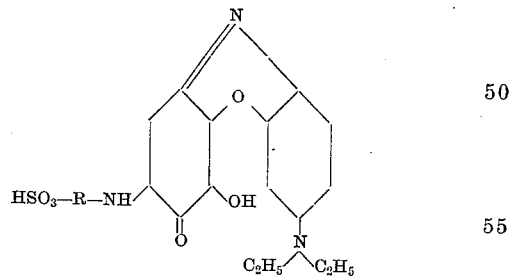

The new dyestuffs possess exceedingly bright and clear blue shades and are of special value for printing, being very fast to the action of chlorin. They are in the shape of their alkaline salts dark powders soluble in water with a blue color and in concentrated sulfuric acid with a reddish color and giving in printing on chrome mordants generally blue shades.

In order to illustrate the new process more fully, I give the following example, the parts being by weight: 50 parts of gallocyanin (obtained from nitrosodiethyl-anilin and gallic acid) are introduced into 300 parts of anilin and a current of air is conducted through the cold mixture while stirring well, so that contact with the air is facilitated. The condensation product is then isolated in a pure state and with an excellent yield. It is soluble in concentrated sufuric acid with a violet color and does not melt on heating it to 200° C. In order to split off the carboxylic group the isolated condensation product or the mass of the reaction is slowly heated to about 100° C. 50 parts of the thus produced gallocyanin anilid are then stirred into 200 parts of fuming sulfuric acid (25 per cent. $SO_3$) at a temperature of 10–15° C. The mass of the reaction is then slowly heated to from 30–40° C. while stirring until a test portion is soluble in a dilute sodium carbonate solution.

The mass of the reaction is poured into water, the sulfonic acid is filtered off and transformed into its ammonium salt which is a brown powder soluble in water with a pure blue and in concentrated sulfuric acid with a magenta-red color.

The new dyestuff dyes chromed wool beautiful fast green-blue shades and produces when printed with chromium compounds on cotton fast green-blue shades.

Instead of anilin, other amins e. g. toluidins, chloroanilins etc. can be used.

I claim:—

1. The herein described process for the manufacture of new dyestuffs, which process consists in condensing and oxidizing gallocyanin made by means of gallic acid and nitrosodiethylanilin at ordinary temperature with aromatic amins, heating them to split off the carboxylic group, and finally sulfonating them, substantially as described.

2. The herein described process for the manufacture of a dyestuff, which process consists in condensing and oxidizing gallocyanin made by means of gallic acid and nitrosodiethylanilin with anilin at ordinary temperature, heating it to split off the carboxylic group, and finally sulfonating it, substantially as described.

3. The herein described new dyestuff sulfonic acids obtainable from gallocyanin made by means of gallic acid and nitrosodiethylanilin, which dyestuffs are in the shape of their alkaline salts dark powders soluble in water with a blue color, and in concentrated sulfuric acid with a reddish color, characterized by great clearness of their shades and remarkable fastness to the action of chlorin; and giving in printing with chrome-mordants on cotton fast blue shades, substantially as described.

4. The herein described new dyestuff sulfonic acid obtainable from anilin and the gallocyanin made by means of gallic acid and nitrosodiethylanilin, which dyestuff is in the shape of its ammonium salt a brown powder soluble in water with a pure blue, and in concentrated sulfuric acid with a magenta-red color; dyeing chromed wool a clear fast green-blue shade, remarkably fast to the action of chlorin, and giving in printing with chrome-mordants on cotton fast green-blue shades, substantially as described.

In testimony whereof I have hereunto set my hand in the presence of two subscribing witnesses.

WILHELM LOMMEL. [L. S.]

Witnesses:
OTTO KÖNIG,
C. J. WRIGHT.